United States Patent
Gilenson et al.

(10) Patent No.: US 9,524,465 B2
(45) Date of Patent: Dec. 20, 2016

(54) SYSTEM AND METHOD FOR ANALYZING AND PRIORITIZING CHANGES AND DIFFERENCES TO CONFIGURATION PARAMETERS IN INFORMATION TECHNOLOGY SYSTEMS

(71) Applicant: E.S.I. SOFTWARE LTD., Rosh Ha'Ayin (IL)

(72) Inventors: Alexander Gilenson, Givatayim (IL); Eyal Oz, Petach-Tikva (IL); Michael Noam, Elad (IL)

(73) Assignee: E.S.I. SOFTWARE LTD, Rosh Ha'ayin (IL)

( * ) Notice: Subject to any disclaimer, the term of this patent is extended or adjusted under 35 U.S.C. 154(b) by 380 days.

(21) Appl. No.: 14/451,449

(22) Filed: Aug. 5, 2014

(65) Prior Publication Data

US 2016/0042285 A1    Feb. 11, 2016

(51) Int. Cl.
*G06N 5/04* (2006.01)
*H04L 12/24* (2006.01)

(52) U.S. Cl.
CPC .......... *G06N 5/046* (2013.01); *H04L 41/0853* (2013.01); *H04L 41/0873* (2013.01); *H04L 41/142* (2013.01); *G06N 5/04* (2013.01); *H04L 41/046* (2013.01)

(58) Field of Classification Search
None
See application file for complete search history.

(56) References Cited

U.S. PATENT DOCUMENTS 8,510,147 B2 *   8/2013   Mitra ................. G06Q 10/0635
                                                              702/25

* cited by examiner

*Primary Examiner* — Wilbert L Starks
(74) *Attorney, Agent, or Firm* — Soroker Agmon Nordman

(57) ABSTRACT

A method for analyzing and prioritizing changes to configuration parameters of applications in an information technology system, including collecting configuration parameters of applications executed on computer stations in a network, storing the collected configuration parameters in a database, comparing the configuration parameters of an application from a specific station with configuration parameters of the application at different stations, determining differences in the configuration parameters by the comparing, analyzing the determined differences according to a set of analysis dimensions that represent rules for evaluating the differences, assigning a score representing the level of conformity of the differences to each of the analysis dimensions, defining a context for reviewing the differences, assigning a weight to each analysis dimension representing the importance of the analysis dimension, adjusting the weights assigned to the analysis dimension based on the context, calculating a total risk for each analysis dimension for displaying to a user.

12 Claims, 3 Drawing Sheets

SYSTEM AND METHOD FOR ANALYZING AND PRIORITIZING CHANGES AND DIFFERENCES TO CONFIGURATION PARAMETERS IN INFORMATION TECHNOLOGY SYSTEMS

TECHNICAL FIELD

The present disclosure relates generally to monitoring granular configuration changes of configuration parameters in information technology (IT) systems over time and configuration differences found by comparing between IT systems and more specifically to prioritizing configuration parameter changes and differences for speeding up and pin-pointing analysis to prevent and/or rectify problems in the IT systems monitored and compared.

BACKGROUND

In the past decades information technology (IT) systems have evolved and increased in complexity. Many years ago a company would use a single computer with a single operating system and small number of programs to supply the computational needs of the company. Nowadays enterprise companies may have hundreds and thousands of computers interconnected over a network. The company may use multiple servers and multiple databases to service hundreds and thousands of computers connecting to them. Essentially each layer of the IT system has evolved and become more complex to control and manage. In some cases multiple servers may be installed with identical software and load balancers may be used to regulate access to the servers. An average business system includes tens and hundreds of thousands of configuration parameters. For example Windows OS contains between 1,500 to 2,500 configuration parameters. IBM WebSphere Application Server has about 16,000, and Oracle Weblogic more than 60,000. If any of these parameters are misconfigured or omitted the change may impact proper operation of the IT system.

The dependence of IT systems on the configuration can have serious consequences, for example in April 2011 Amazon Web Services suffered a devastating event that knocked offline some of their clients for as much as four days. It turned out that a network configuration error made during a network upgrade caused the problem. In the past upgrades were rare and applied slowly to the client servers. Nowadays especially with the help of the Internet upgrades for some software packages may be released on a daily basis and even automatically applied. If a problem arises in response to an upgrade most systems are incapable of presenting an administrator with a list of changes let alone suggest what changes are the most probable cause of the problem.

It is thus desirable to improve the ability to avoid problems in IT system updates and day-to-day operation and to reduce the mean time to resolution (MTTR) for handling problems that still occur in the IT systems. The prevention of problems and reduction of the MTTR can help to prevent economic damage to the organization.

SUMMARY

An aspect of an embodiment of the disclosure relates to a system and method for analyzing and prioritizing changes to configuration parameters of applications in an information technology system. The system includes an agent application that is installed on stations connected in a network implementing the information technology system. The agent application collects configuration parameters of applications installed on the stations including the details of the hardware of the stations. The collected configuration parameters are stored in a database. A computer server accesses the database and analyzes the configuration parameters. The server compares configuration parameters of a station with configuration parameters taken from different stations or at different times at the same station. The server identifies differences in the configuration parameters between similar installations of the applications and or changes over time.

The server analyzes the changes and differences according to a set of analysis dimensions that represent rules for evaluation of the differences, for example if the difference is related to being inconsistent with the other stations or to not changing as frequently as other stations. The server provides a score according to how much the difference corresponds to the analysis dimension. Optionally, the scores are stored in a list at the server.

In an exemplary embodiment of the disclosure, a user can then analyze the differences based on the analysis dimension scores. Optionally, the user defines a context for analyzing the differences, for example one context may be to find the configuration parameters relevant to a failure due to a problem in the system, which appeared over time due to changes in configuration parameters. Another context may be to check implementation of a new release of the application. Once the context is defined the user or user station assigns weights to the analysis dimensions reflecting the importance of the analysis dimension in view of the defined context, for example some analysis dimensions may be unimportant in a specific context and some may be critical.

Optionally, the user calculates a total risk for each analysis dimension based on the analysis dimension scores and the analysis dimension weights. In an exemplary embodiment of the disclosure, the total risk is displayed to the user so that the user may update the weights and recalculate to identify suspicious differences that may need to be dealt with.

There is thus provided according to an exemplary embodiment of the disclosure, a method for analyzing and prioritizing changes to configuration parameters of applications in an information technology system, comprising:

Collecting configuration parameters of applications executed on computer stations connected in a network implementing the information technology system;

Storing the collected configuration parameters in a database;

Comparing the configuration parameters of an application from a specific station with configuration parameters of the application at different stations;

Determining differences in the configuration parameters by the comparing;

Analyzing the determined differences according to a set of analysis dimensions that represent rules for evaluating the differences;

Assigning a score representing the level of conformity of the differences to each of the analysis dimensions;

Defining a context for reviewing the differences;

Assigning a weight to each analysis dimension representing the importance of the analysis dimension;

Adjusting the weights assigned to the analysis dimension based on the context;

Calculating a total risk for each analysis dimension by multiplying the analysis dimension scores for each difference with the weights and summating for each analysis dimension over all differences; and displaying the calculated total risk.

In an exemplary embodiment of the disclosure, the method further includes comparing the configuration parameters of an application from a specific station with the same configuration parameters stored at a later time. Optionally, the score is assigned to reflect inconsistencies between servers that are supposed to be identical. In an exemplary embodiment of the disclosure, the context is to investigate a problem occurring in the system. Alternatively, the context is to check implementation of a new release of the application. Further alternatively, the context is to perform a periodic check to prevent the occurrence of problems.

In an exemplary embodiment of the disclosure, scores are assigned based on temporal factors related to the differences between configuration parameters. Alternatively, scores are assigned based on the role of the station executing the application. Further alternatively, scores are assigned based on knowledge of the role of the configuration parameters. In an exemplary embodiment of the disclosure, collecting is performed by local operating system routines on the computer station responsive to a request from a server.

There is further provided according to an exemplary embodiment of the disclosure, a system for analyzing and prioritizing changes to configuration parameters of applications in an information technology system, comprising:

an agent application for collecting configuration parameters of applications executed on computer stations connected in a network implementing the information technology system;

a database for storing the collected configuration parameters;

a server computer for comparing the configuration parameters of an application from a specific station with configuration parameters of the application at previous times or on different stations, determining differences in the configuration parameters by the comparing, analyzing the determined differences according to a set of analysis dimensions that represent rules for evaluating the differences; assigning a score representing the level of conformity of the differences to each of the analysis dimensions; defining a context for reviewing the differences; assigning a weight to each analysis dimension representing the importance of the analysis dimension; adjusting the weights assigned to the analysis dimension based on the context; calculating a total risk for each analysis dimension by multiplying the analysis dimension scores for each difference with the weights and summating for each analysis dimension over all differences; and a display for displaying the calculated total risk.

There is further provided according to an exemplary embodiment of the disclosure, a non-transitory computer readable medium for storing program code to execute the method according to claim 1.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

Figure 1:
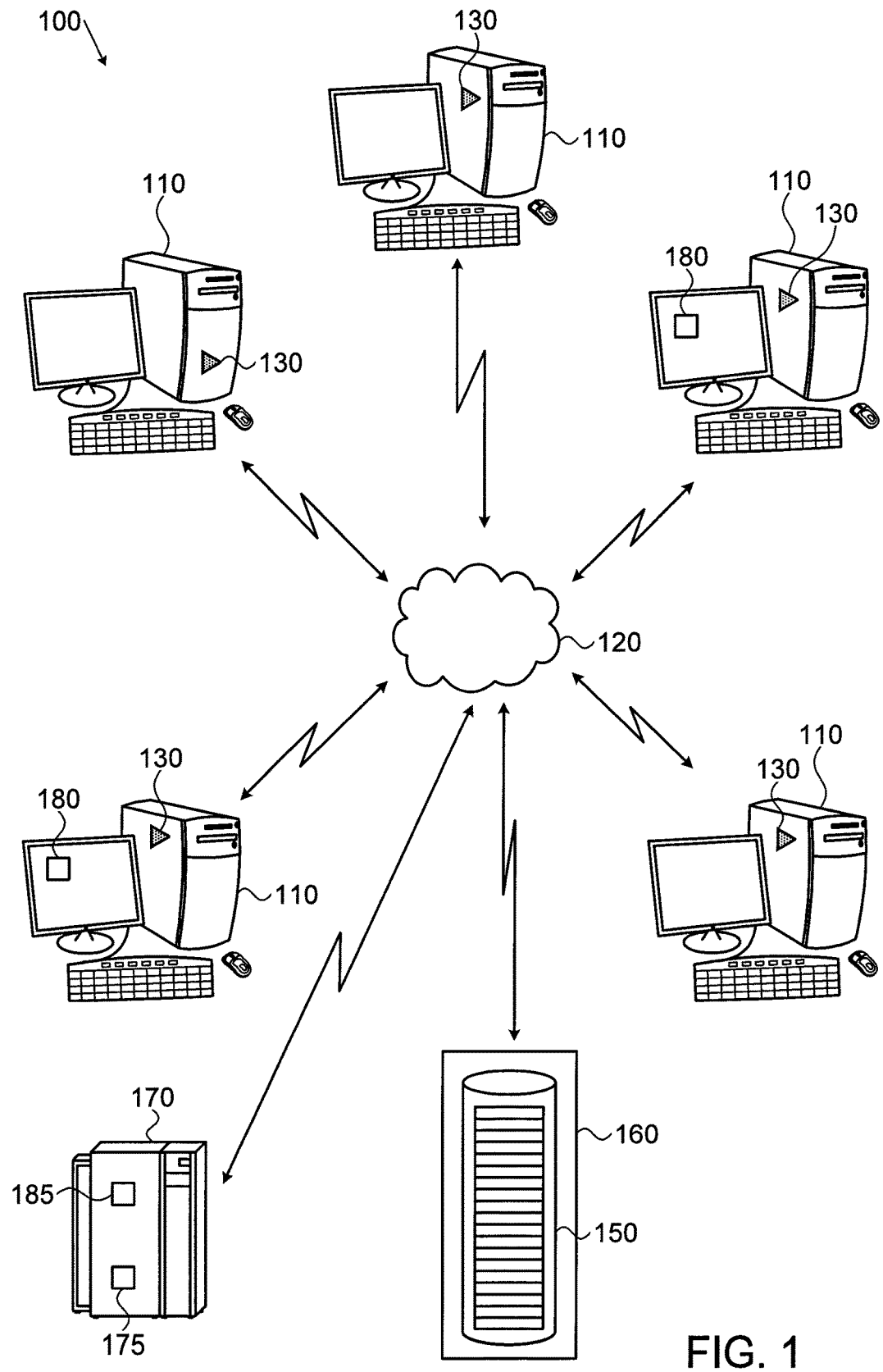
FIG. 1 is a schematic illustration of a network of computers connected in an information technology system, according to an exemplary embodiment of the disclosure.

FIG. 1 is a schematic illustration of a network of computers connected in an information technology system 100, according to an exemplary embodiment of the disclosure. In an exemplary embodiment of the disclosure, IT system 100 includes multiple stations 110 connected over a network 120. Optionally, each station 110 may serve as a workstation for accessing servers or may be a server for providing services to users of workstations. Network 120 may be a local area network (LAN), a wide area network (WAN) (e.g. the Internet) or any other type of network over which stations 110 may communicate. Optionally, each station 110 executes an agent application 130 for monitoring and collecting information at the station 110. The collected information includes configuration parameters 150 relating to the hardware and software installed in the stations 110 of IT system 100. Optionally, the configuration parameters 150 may be collected periodically or upon occurrence of a change to the configuration parameters 150. In some embodiments of the disclosure, the configuration parameters may be only collected on specific stations 110, for example only on servers or only on specific servers that are important to IT system 100.

The stations 110 may be any type of general purpose computer including a processor and memory. Optionally, they may be standard desktop computers, dedicated server computers, rack mount computers, laptop computers, mobile devices or any other type of computer.

In an exemplary embodiment of the disclosure, the information collected by agent application 130 is stored in a database 160. Optionally, an agent server 170 analyzes the collected information to detect differences between installations of the same applications on different work stations/servers, or changes over time on the same workstation/server or on different workstations/servers.

In some embodiments of the disclosure, instead of installing a dedicated agent application 130, the information is collected by standard API applications that are executed by the local operating system on the station 110 responsive to a request from agent server 170 or from other computer stations 110. Optionally, agent server 170 polls the stations 110 to extract the information instead of extracting the information directly from database 160, and then agent server 170 stores the information in database 160.

The configuration parameters 150 may include hardware details of the station 110, for example the amount of RAM, processor model, disk size, and models of devices attached. Optionally, the configuration parameters 150 may include firmware details, such as BIOS version, BIOS size and a checksum (e.g. CRC). Alternatively or additionally, the configuration parameters 150 may include details of application software installed on the station 110, including metadata (e.g. when installed and by whom) and application data.

The applications may include operating systems, client server applications, database applications, or corporate applications used by a corporation to support the corporate activity, for example the applications may include SQL servers and web servers.

In an exemplary embodiment of the disclosure, configuration parameters 150 may include: application identity, application version, date of installation, name of the user that installed the application, updates installed, drivers installed, names and sizes of files belonging to each application, values of controllable parameters for configuring applications, file sizes, file checksums, registry content, available RAM, available disk space and any other information for identifying the status or affect of the software installed on the stations 110. Optionally, the number of recorded parameters dealt with by IT system 100 may be between 10 to 100, 100 to 1000, 1000 to 10000, 10000 to 100000 or more.

In some embodiments of the disclosure, agent application 130 may be installed on one or more stations 110 that are not connected together over a network, for example at different organizations/clients. Optionally, the information may be stored locally and collected for example using an external disk, disk on key or by temporarily connecting the station to a wide area network such as the Internet and transmitting the information to database 160. In an exemplary embodiment of the disclosure, agent server 170 can be used to compare similar installations of applications at different organizations/clients to debug applications or resolve problems in installations.

Figure 2A:
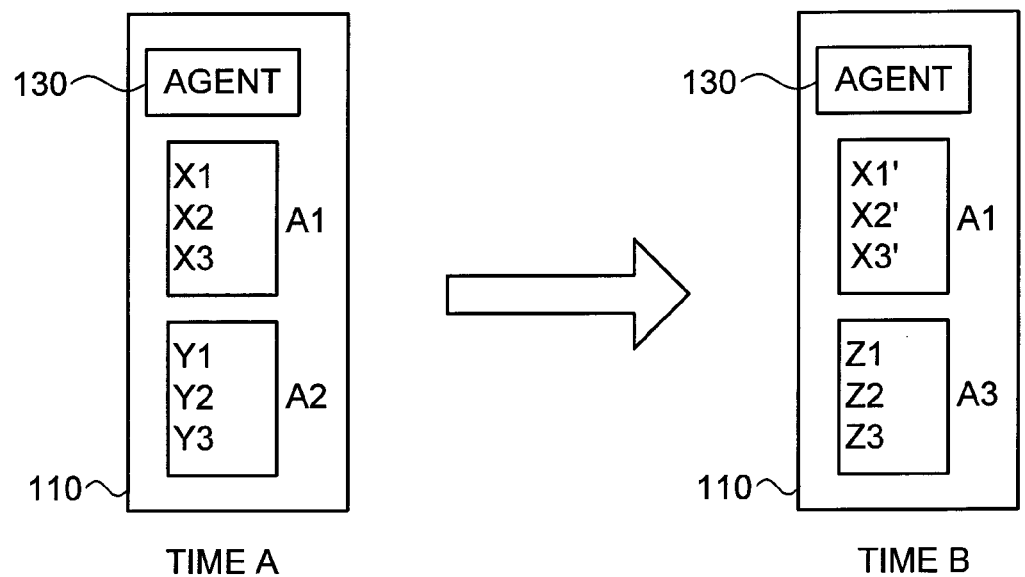
FIG. 2A is a schematic illustration of configuration parameters of an exemplary station in an information technology network at two different times, according to an exemplary embodiment of the disclosure.

FIG. 2A is a schematic illustration of configuration parameters of an exemplary station in an information technology network at two different times, according to an exemplary embodiment of the disclosure. In an exemplary embodiment of the disclosure, agent 130 examines station 110 at time A to determine configuration parameters. Station 110 may have installed applications A1, A2 with configuration parameters (X1, X2, X3) and (Y1, Y2, Y3) respectively. At time B station 110 may have installed applications A1 and A3 (instead of A2) with configuration parameters (X1', X2', X3') and (Z1, Z2, Z3) respectively. Optionally, this information is stored in database 160 and analyzed by agent server 170 to identify differences between the configuration parameters 150 on station 110 at different times.

Figure 2B:
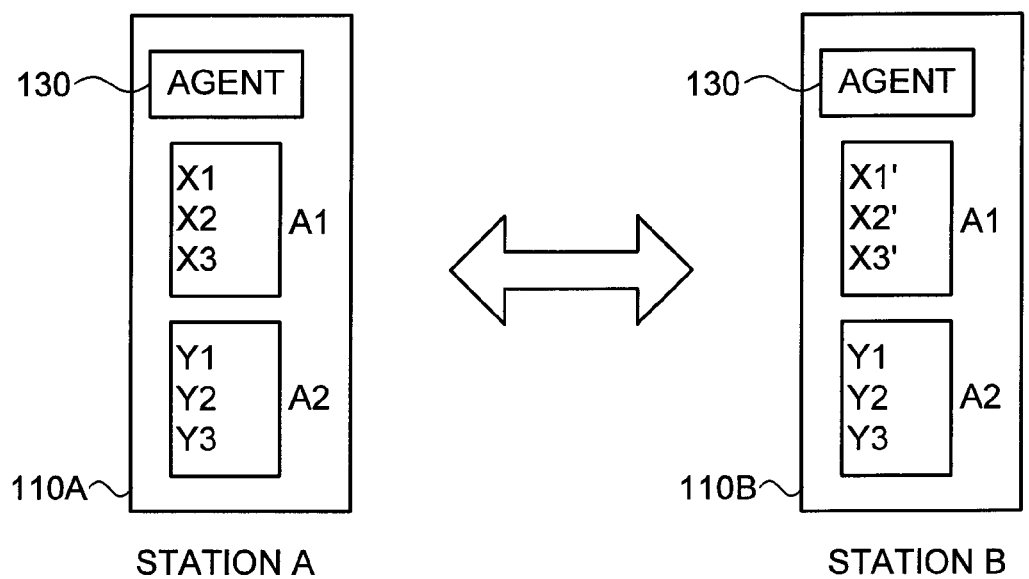
FIG. 2B is a schematic illustration of configuration parameters of two different stations in an information technology network at essentially the same time, according to an exemplary embodiment of the disclosure.

FIG. 2B is a schematic illustration of configuration parameters of two different stations in an information technology network 100 at essentially the same time, according to an exemplary embodiment of the disclosure. In an exemplary embodiment of the disclosure, agent 130 examines a first station 110A at a specific time. An agent application 130 installed on a second station 110B examines the second station 110B at essentially the same time. In an exemplary embodiment of the disclosure station 110A may have installed applications A1 and A2 with configuration parameters (X1, X2, X3) and (Y1, Y2, Y3) respectively. Likewise station 110B may also have installed applications A1 and A2 with configuration parameters (X1', X2', X3') and (Y1, Y2, Y3) respectively on station 110B. Optionally, this information is stored in database 160 and analyzed by agent server 170 for determining differences between the configuration parameters 150 of an installation on one station relative to another, for example wherein one application has the same configuration parameters and one application has different parameters as illustrated in FIG. 2B.

Figure 3:
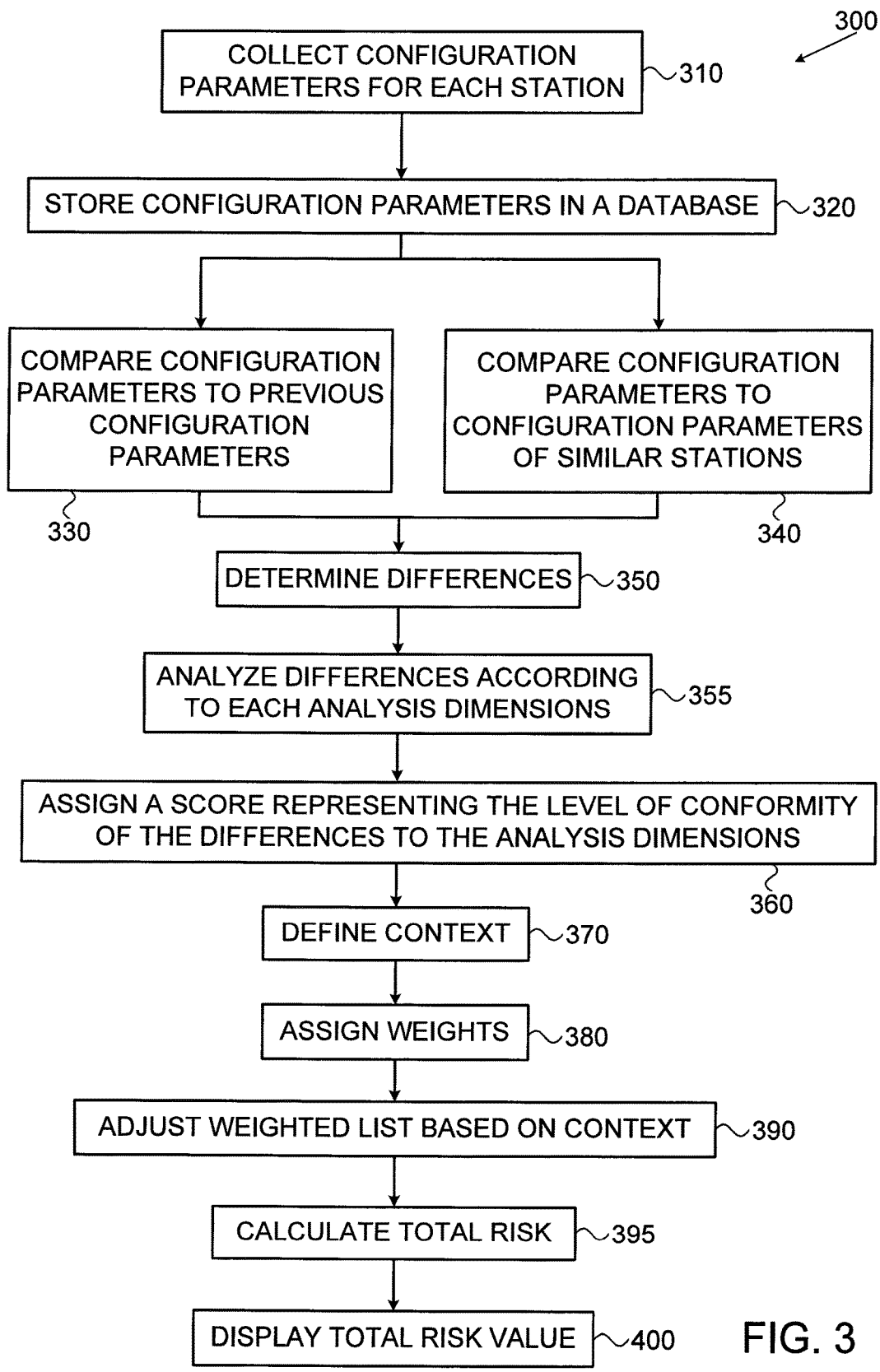
FIG. 3 is a flow diagram of a method of analyzing configuration parameters, according to an exemplary embodiment of the disclosure.

FIG. 3 is a flow diagram of a method 300 of analyzing and prioritizing configuration parameters, according to an exemplary embodiment of the disclosure. As explained above agent 130 collects (310) the configuration parameters 150 for each station 110 and transfers the configuration parameters 150 to be stored at database 160. Optionally, the configuration parameters 150 may be stored (320) directly in database 160 by agent 130 or transferred to agent server 170 for storing (320) the configuration parameters 150 in database 160. In an exemplary embodiment of the disclosure, agent server 170 retrieves the information from database 160 and analyzes the configuration parameters 150 by comparing (330) the configuration parameters 150 of each station with configuration parameters 150 collected at different times by the station 110, to identify changes over time (referred to as a drift). Alternatively or additionally, agent server 170 may compare (340) the configuration parameters 150 of one station 110 with the configuration parameters 150 of other stations 110 with similar applications installed, to identify changes in configuration parameters 150 responsive to differences between the two stations or to determine if a configuration parameter change was applied to all stations 110 with a specific application or only to specific stations 110.

In an exemplary embodiment of the disclosure, agent server 170 determines (350) differences as a function of time or as a function of location/station. In some embodiments of the disclosure agent server 170 includes a knowledgebase 175 with rules defining analysis dimensions for analyzing (355) the identified differences and assigning (360) a score to the identified differences representing the level of conformity to the analysis dimension. Optionally, a score list 185 will be stored at agent server 170 with the score value of each difference for each analysis dimension.

In an exemplary embodiment of the disclosure, the analysis dimension list is dynamic and includes three different types of analysis dimensions:

1. Predefined dimensions—these dimensions are automatically calculated by agent server 170. These dimensions do not require any user input.

Optionally, the predefined dimensions include:
   a. Consistency: calculate the consistency of the identified difference according to the consistency of the identified difference value to a consistency group defined in the analysis session (e.g. do all the members of the group have this value or do they all have different values).
   b. Frequency: Calculate the number of times this specific identified difference changed in a given time frame (e.g. a higher score may be associated if the identified difference frequency is lower or higher than for other differences).
   c. Impact: based on accumulative knowledge collected from dozens of system experts a specific identified difference impact rank is assigned based on impact area and severity of change.
   d. Operation type: each identified difference is either an added, deleted or modified value. Each of these actions get a different score value
   e. Automatic-policy: as agent server 170 collects the data from many servers, it can create for each identified difference a "current value distribution" profile. This value distribution profile is used to define values that are in profile or out of profile. This gives a powerful tool to automatically assert if a value is risky or not based on the other values of this identified difference across all the servers.

2. User-input dimensions—these dimensions are calculated based on user input. The user input varies and can affect a specific identified difference or a logical group of identified difference. In this list we have:

a. Authorized: an identified difference gets an authorized/unauthorized mark based on specific time ranges defined by the user and on specific users that are authorized to do changes at those time. For example the user can define a rule that says "authorize only changes that happen between Friday midnight till Sunday midnight and done by the IT group personal" All these changes will be marked authorized all the rest will be marked as unauthorized.

b. Host type: each host can get a specific host type and thus get a specific risk value. For example every host that is marked as "Production" will get a higher risk score then a host that is marked "QA" (quality assurance).

c. State: The user can change a specific identified difference state. For example the user can: close an identified difference, mark it as Suspect, Mark it as authorized etc.

d. User-defined policy: a user can define a policy of specific identified difference or a sub-tree of identified differences. The Analytics engine now can calculate based on this value in policy or out of policy per specific identified difference.

3. User defined dimension—a user defined dimension is a logical group of identified differences (filter) that is defined by the user and can get a specific risk score. For example a user can decide that every identified difference that contains a password is very important and should get a higher risk score.

In an exemplary embodiment of the disclosure, after assigning a score for each analysis dimension in score list 185 the user may define (370) or select a context for analyzing the differences, for example the context may be:

a. Incident investigation—to analyze a problem occurring in the system;

b. Release validation—to check implementation of a new release of an application;

c. Avoid risk—to perform a periodic check to prevent the occurrence of problems, for example checking every day or every hour or any other time interval. Optionally, the check may be performed any time a specific event occurs, for example to verify that no serious changes have taken place.

In an exemplary embodiment of the disclosure, a weight is assigned (380) for each analysis dimension indicating the level of importance of the analysis dimension. In some embodiments of the disclosure, a weighted list 180 (FIG. 1) will be built by the user at the user station 110 including the weights for each analysis dimension. In some embodiments of the disclosure, the user may assign the weights or the weights may be assigned or adjusted (390) automatically based on the context, for example the user may select a context and the weights are adjusted accordingly, for example the weights may be increased or decreased according to the context.

In an exemplary embodiment of the disclosure, station 110 multiplies the analysis dimension scores from list 185 for each difference with the weights from weight list 180 for each analysis dimension and summates a total risk score for each analysis dimension for all the differences. Optionally, the total risk scores for the analysis dimensions are displayed (400) to the user at station 110, so that the user may adjust contexts or weights and/or act on the results, for example checking the analysis dimension with the highest risk score, correcting changes, reinstalling software or taking other corrective measures to prevent station failure or locate errors.

Optionally, an administrator user can review the changes prioritized according to their importance in the appropriate context, for example in an incident investigation the total risk score may be used to significantly pinpoint the changes, which are expected to be related to the problem. For example in the case of an incident investigation, changes related to the time of failure and place of failure are more relevant than other changes. Whereas in the case of release validation changes related to the updated application or applications that interact thereon are more relevant and provided with a higher weight.

Following are a few examples related to the score for the analysis dimension to exemplify the details above. In an exemplary embodiment of the invention, the analysis dimension provides a score for consistency of parameters relative to other stations, for example if a specific configuration parameter 150 is inconsistent with its value in most installations it will be provided a higher score than if it is consistent. Likewise if a configuration parameter 150 is inconsistent with production installations but consistent with development installations then if the server is a production server it will have a higher score value but if the server is a development server it will have a lower score value.

In an exemplary embodiment of the disclosure, agent server 170 provides a greater score to changes that were made by unauthorized users in contrast to authorized users, so that those changes will be ordered with a higher priority. Likewise a change that is inconsistent with other stations 110, for example wherein only the configuration parameters of a specific application on a single station change may be more suspicious than if the configuration parameters changes for all stations with the application.

In some embodiments of the disclosure, the analysis dimension score of a difference/change is affected by environmental factors, for example if the available working memory (RAM) changes at the same time as when specific configuration parameters of an application change, or if a configuration parameter change is consistent with other stations. Optionally, the score may be affected by temporal factors or frequency factors, for example a parameter that did not change for a year and suddenly changes, relative to a parameter that changes once a week. In a similar manner a configuration parameter with a value that toggles back and forth would be less suspicious and have a lower score than a value that is generally constant.

In some embodiments of the disclosure, the analysis dimension score is affected by process factors, for example if changes are generally performed at a specific time interval, such as between two to four at night (which is defined in the corporation as the time for performing changes) then such a change would be less suspicious than a change that is performed at an unauthorized time Likewise if a certain person is in charge of performing the process then a change by an unauthorized person would be considered more suspicious. A change that is generally performed automatically would generally be less suspicious than a change that was performed manually.

In some embodiments of the disclosure, the analysis dimension score is affected by the identity of the station 110, for example if the change occurs on a test server or a QA server it is considered less significant than a change occurring on a production server. Optionally, if a user approved the change of a configuration parameter it may be considered less suspect and have a lower score.

In some embodiments of the disclosure, configuration parameters related to codes or passwords may be considered more suspect than other variables.

In an exemplary embodiment of the disclosure, after building analysis dimension score list 185 on agent server 170 each user can process the score list locally at there station 110. The user defines the context of the evaluation process, the weights are adjusted (390) to match the context and the calculated total risk (395) is analyzed to find the most suspect/relevant changes thus helping the administrator in identifying problematic changes. Optionally, agent server 170 keeps track of the meta-data related to the identified changes, so that the administrator may review the time, location, identity of the user and other details related to performance of the change and determine if a specific change is relevant to the current context.

In some embodiments of the disclosure, agent server 170 may be used periodically (e.g. every day, every week) by an administrator to verify correctness of IT system 100 and/or verify correctness of changes occurring in IT system 100.

In some embodiments of the disclosure, applications provide the knowledgebase 175 of agent server 170 with details regarding the role of configuration parameters so that agent server 170 may use the knowledgebase 175 to set scores according to the role of the configuration parameters and/or verify correctness of an installation or upgrade, for example by knowing what values are sometimes correct and what values are never correct. Optionally, agent server 170 can monitor consistency of servers that are supposed to be identical and provide scores or warnings if the configuration parameters are inconsistent.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure. It will also be appreciated by persons skilled in the art that the present disclosure is not limited to what has been particularly shown and described hereinabove.

We claim:

1. A method for analyzing and prioritizing changes to configuration parameters of applications in an information technology system, comprising:
   collecting configuration parameters of applications executed on computer stations connected in a network implementing the information technology system;
   storing the collected configuration parameters in a database;
   comparing the configuration parameters of an application from a specific station with configuration parameters of the application at different stations;
   determining differences in the configuration parameters by said comparing;
   analyzing the determined differences according to a set of analysis dimensions that represent rules for evaluating the differences;
   assigning a score representing the level of conformity of the differences to each of the analysis dimensions;
   defining a context for reviewing the differences;
   assigning a weight to each analysis dimension representing the importance of the analysis dimension;
   adjusting the weights assigned to the analysis dimension based on the context;
   calculating a total risk for each analysis dimension by multiplying the analysis dimension scores for each difference with the weights and summating for each analysis dimension over all differences;
   displaying the calculated total risk.

2. The method of claim 1, further comprising comparing the configuration parameters of an application from a specific station with the same configuration parameters stored at a later time.

3. The method of claim 1, wherein the score is assigned to reflect inconsistencies between servers that are supposed to be identical.

4. The method of claim 1, wherein the context is to investigate a problem occurring in the system.

5. The method of claim 1, wherein the context is to check implementation of a new release of the application.

6. The method of claim 1, wherein the context is to perform a periodic check to prevent the occurrence of problems.

7. The method of claim 1, wherein scores are assigned based on temporal factors related to the differences between configuration parameters.

8. The method of claim 1, wherein scores are assigned based on the role of the station executing the application.

9. The method of claim 1, wherein scores are assigned based on knowledge of the role of the configuration parameters.

10. The method of claim 1, wherein said collecting is performed by local operating system routines on the computer station responsive to a request from a server.

11. A non-transitory computer readable medium for storing program code to execute the method according to claim 1.

12. A system for analyzing and prioritizing changes to configuration parameters of applications in an information technology system, comprising:
   an agent application for collecting configuration parameters of applications executed on computer stations connected in a network implementing the information technology system;
   a database for storing the collected configuration parameters;
   a server computer for comparing the configuration parameters of an application from a specific station with configuration parameters of the application at previous times or on different stations, determining differences in the configuration parameters by said comparing, analyzing the determined differences according to a set of analysis dimensions that represent rules for evaluating the differences; assigning a score representing the level of conformity of the differences to each of the analysis dimensions; defining a context for reviewing the differences; assigning a weight to each analysis dimension representing the importance of the analysis dimension; adjusting the weights assigned to the analysis dimension based on the context; calculating a total risk for each analysis dimension by multiplying the analysis dimension scores for each difference with the weights and summating for each analysis dimension over all differences; and
   a display for displaying the calculated total risk.

* * * * *